US005535205A

United States Patent [19]

Horii

[11] Patent Number: 5,535,205

[45] Date of Patent: Jul. 9, 1996

[54] CELL STATION AND PERSONAL STATIONS IN A DIGITAL RADIO COMMUNICATION SYSTEM

[75] Inventor: Seiji Horii, Kashihara, Japan

[73] Assignee: Matsushita Electric Industrial Co., Ltd., Osaka, Japan

[21] Appl. No.: 417,918

[22] Filed: Apr. 6, 1995

[30] Foreign Application Priority Data

Sep. 10, 1992 [JP] Japan .................................... 4-241618

[51] Int. Cl.[6] ........................................................ H04L 1/20

[52] U.S. Cl. ............................ 370/79; 370/95.1; 371/5.5

[58] Field of Search ................ 371/5.5, 30; 395/184.01; 370/79, 82, 95.1, 95.3; 379/58, 57, 60, 63; 455/33.1, 33.2, 53.1, 54.1, 54.2, 56.1

[56] References Cited

U.S. PATENT DOCUMENTS

| | | | |
|---|---|---|---|
| 5,191,583 | 3/1993 | Pearson et al. | 370/82 |
| 5,289,471 | 2/1994 | Tanaka et al. | 370/95.3 |
| 5,400,320 | 3/1995 | Tanaka et al. | 370/13 |
| 5,430,743 | 7/1995 | Marturano et al. | 371/5.5 |
| 5,436,917 | 7/1995 | Karasawa | 371/5.5 |

FOREIGN PATENT DOCUMENTS

| | | |
|---|---|---|
| 63-20933 | 1/1988 | Japan . |
| 63-217766 | 9/1988 | Japan . |

*Primary Examiner*—Wellington Chin
*Attorney, Agent, or Firm*—Price, Gess, & Ubell

[57] ABSTRACT

A cell station and a personal station at a sender's end in the cell station's radio zone which carry out digital radio communication and monitors whether wave condition is good or bad by calculating a generation rate of errors. When the wave condition is good, data links are established between the cell station and the personal station at the sender's end, and between the cell station and the personal station at the opposite end. Information signals are sent and received through the data links. When the wave condition is good, control delay by processing of layer 2 can be prevented. (Effect)

The speed of the digital radio communication increases while the reliability of sending and receiving information signals is ensured.

36 Claims, 9 Drawing Sheets

MODE TRANSITION SEQUENCE (DEMAND FROM COMMUNICATION TRANSLATION NODE)

construction of wireless communication system

CS : cell station
PS : personal station

FIG. 4 translation／passage mode transition commands t3

| | |
|---|---|
| 0000<br>... | |
| 1001 | translation mode transition demand |
| 1002 | translation mode transition response |
| 1003 | translation mode transition direction |
| 1004 | passage mode transition demand |
| 1005 | passage mode transition response |
| 1006 | passage mode transition direction |
| ...<br>FFFF | |

MODE TRANSITION SEQUENCE (DEMAND FROM COMMUNICATION NODE)

MODE TRANSITION SEQUENCE (DEMAND FROM COMMUNICATION TRANSLATION NODE)

CELL STATION AND PERSONAL STATIONS IN A DIGITAL RADIO COMMUNICATION SYSTEM

BACKGROUND OF THE INVENTION

1. Field of the Invention

The present invention relates to a cell station and personal stations in a digital radio communication system.

2. Description of the Related Art

In recent years, a digital radio communication system between the cell station (CS) and personal stations (PSs) using TDMA/TDD (Time Division Multiple Access/Time Division Duplex) techniques is being developed.

The PSs are portable. Therefore, they are carried not only to areas of good wave conditions but also to areas of bad wave conditions. Bad wave conditions correspond to, for example, areas which overlap with other CS's radio zone, and areas where direct waves and indirect waves created by reflections from buildings interfere with each other. Since PSs are carried between areas of good wave conditions and bad wave conditions, normally, a transmit control procedure is applied for error correction/detection control and re-transmit control for transmit errors. In the conventional digital radio communication system, transmit control procedure is applied between the PS at a sender's end and the CS, and between the CS and the PS at a receiver's end. For example, LAPDC (Link Access Procedure for Digital Cordless) is used in PHS (Personal Handy Phone System). This LAPDC is a communication protocol which corresponds to layer 2 of the OSI reference model, using the sub set of HDLC (High-level Data Link Control Procedure). By using the communication protocol like this, reliability of data sending and receiving can be more enhanced. That's because when LAPDC and HDLC are applied, the CS and the PSs can cope with transmit errors by a correction function and a re-sending control function.

According to the conventional art, the digital radio communication system can ensure, by the communication protocol, the reliability of data sending and receiving even though the wave condition is bad. However, in areas of good wave condition, speed of the communication decreases since some processing for using the communication protocol is needed. Specifically, the communication protocol is applied between the PS at the sender's end and the CS, and between the CS and the PS at the receiver's end. So while the data is sent from the PS at the sender's end to the PS at the receiver's end, delay time is generated for the protocol processing at the CS. The speed of the communication is sacrificed by using the communication protocol even in areas of good wave condition.

SUMMARY OF THE INVENTION

It is an object of this invention to provide a cell stations which can increase the speed of the digital radio communication, ensuring the reliability of sending and receiving information signals.

Another object of this invention is to provide personal stations which can increase the speed of the digital radio communication, ensuring the reliability of sending and receiving information signals.

The first object may be fulfilled by the cell station which shows the following 5 features.

(1) A cell station for relaying communication between a first personal station and a second personal station in a digital radio communication system, the digital radio communication system having a plurality of personal stations and the cell station, comprises a first sending and receiving unit for sending and receiving frames to and from the first personal station; a second sending and receiving unit for sending and receiving frames to and from the second personal station; a first data link unit for controlling a data link when the frames are sent and received to and from the first sending and receiving unit and the first personal station by application of a transmit control procedure including error correction/detection control and frame re-transmit control for transmit errors; a second data link unit for controlling a data link when the frames are sent and received to and from the second sending and receiving unit and the second personal station by the application of the transmit control procedure including error correction/detection control and frame retransmit control for transmit errors; a relay unit for translating the frames alternatively between the first sending and receiving unit and the second sending and receiving unit; a switch judgement unit for judging whether application of the transmit control procedure should be stopped or resumed, according to the condition of the frame sending and receiving between the first sending and receiving unit and the first personal station, and between the second sending and receiving unit and the second personal station; and a control unit for controlling the first and the second data link unit to stop application of the transmit control procedure when the switch judgement unit judges the application of the transmit control procedure should be stopped, and to resume the application of the transmit control unit when the switch judgement unit judges the application of the transmit control procedure should be resumed.

(2) The control unit may include a flag hold unit for holding a flag for showing the application of the transmit control procedure when it is on, and showing stop of the application when it is off; a stop unit for controlling the first and the second data link unit to stop the application of the transmit control procedure when the switch judgement unit judges the application of the transmit control procedure should be stopped, and turning the flag off; and a resume unit for controlling the first and the second data link unit to resume the application of the transmit control procedure when the switch judgement unit judges the application of the transmit control procedure should be resumed, and turning the flag on.

(3) The switch judgement unit may include a monitor unit for monitoring a generation rate of communication errors corresponding to deterioration of the condition of the frame sending and receiving; a threshold value hold unit for holding a predetermined threshold value; and a judgement unit for comparing the generation rate and the threshold value, judging that the application of the transmit control procedure should be stopped when the generation rate is lower, and judging that the application should be resumed when the generation rate is higher.

(4) The switch judgement unit may include a demand detection unit for detecting one of a demand to resume and a demand to stop the application of the transmit control procedure included in the frames from the first and the second personal station; a judgement unit for judging that the application of the transmit control procedure should be stopped when the demand to stop the application is included in the frame, and judging that the application of the transmit control procedure should be resumed when the demand to resume the application is included in the frame; and the first and the second personal station send the demand to stop the application of the transmit control procedure to the cell station when the condition of the frame sending and receiving is good, and send the demand to resume the application of the transmit control procedure to the cell station when the condition of the frame sending and receiving is bad.

(5) The digital radio communication system may be a PHS, which is a Personal Handy Phone System, of a TDMA/TDD technique; the demand to stop the application of the transmit control procedure may be sent by using one of an SACCH and a FACCH, which are standardized in the PHS; and the demand detection unit may detect the demand to stop the application of the transmit control procedure included in one of the SACCH and the FACCH.

According to the construction (1) to (5), in areas of bad wave condition, the frames are sent and received based on the application of the transmit control procedure by the first and the second data link means, and the reliability of sending and receiving the frames can be enhanced. In areas of good wave condition, the application of the transmit control procedure is stopped, which can prevent the delay of frame-reaching created by the error correction control, error detection control, and the re-transmit control at the cell station. So, the speed of the communication increases, while the reliability of sending and receiving the information signals is ensured.

The second object may be fulfilled by the personal stations which show the following 2 features.

(1) A personal station for digital radio communication relayed by a cell station, the digital radio communication system having a plurality of personal stations and the cell station, comprises a sending and receiving unit for sending and receiving frames to and from an other personal station relayed by the cell station; a data link unit for applying a transmit control procedure to the frame sending and receiving between the sending and receiving unit and the cell station; a monitor unit for monitoring a generation rate of communication errors in the received frames by the sending and receiving unit; and a control unit for making the sending and receiving unit send a demand to stop application of the transmit control procedure to the cell station when the generation rate is lower than a predetermined threshold value.

(2) The control unit may further include a resume demand sending control unit for making the sending and receiving unit send a demand to resume the application of the transmit control procedure to the cell station, when the generation rate is higher than the predetermined threshold value.

According to the construction (1) and (2), when the generation rate of the communication error is low, the demand to stop the application of the transmit control procedure is sent to the cell station and the cell station stops the application. So in areas of good wave condition, the delay of frame reaching by the processing of layer 2 at the cell station can be prevented. As described above, the speed of the communication increases, while the reliability of sending and receiving the information signals is ensured.

BRIEF DESCRIPTION OF THE DRAWINGS

The object, advantages and features of the invention will become apparent from the following description thereof taken in conjunction with the accompanying drawings which illustrate a specific construction of the invention. In the drawings:

FIG. 4 shows mode transition sequence commands sent by the SACCH.

DESCRIPTION OF THE PREFERRED EMBODIMENTS

In the following embodiment, a digital radio communication system comprises the CS and the PSs will be described by means of FIGS. 1–9.

<Digital Radio Communication System>

Figure 1:
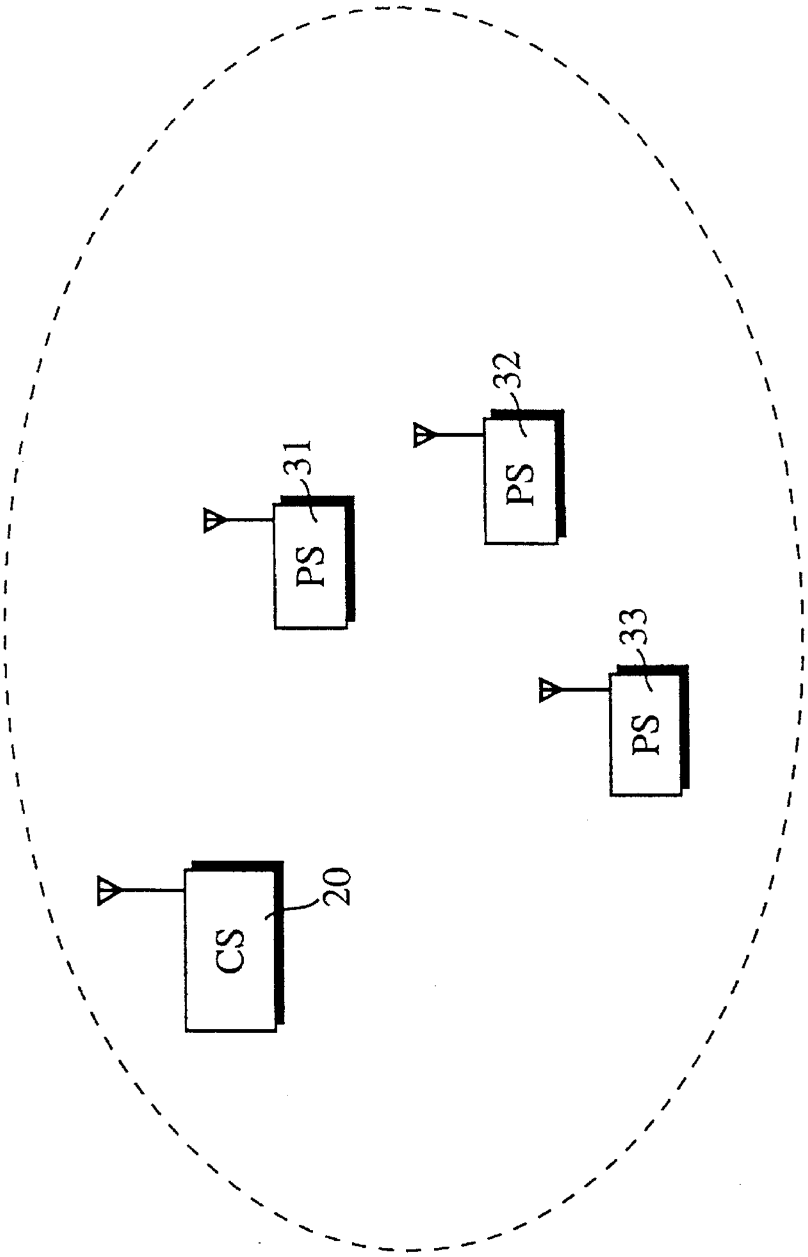
FIG. 1 shows construction of a radio system of the present embodiment.

FIG. 1 shows the construction of the digital radio communication system of the embodiment. The digital radio communication system comprises a fixed CS 20 and a plurality of portable PSs 31, 32, and 33. This digital radio communication system is PHS using the second generation cordless telephone system. The digital radio communication is carried out by TDMA/TDD techniques. In TDMA/TDD techniques, a radio channel is physical and designated by frequency (carrier) and Specific time slot. The radio channel comprises a control channel and a communication channel: the control channel is used for sending and receiving the control signal for place registration and data sending/receiving, and the communication channel is used for sending and receiving the information signal such as audio, data and the like.

This information signal is sent or received by TCH (Traffic Channel). By the time division multiplexing, TCH and SACCH (Slow Added Control Channel) are combined in the same physical slot. The data link for sending and receiving the information signal is established by the SACCH.

The relation between construction of frame and TCH/SACCH is explained next. As shown the by reference character t0 in FIG. 2, the physical slot of layer 2 of in the second generation cordless telephone system, includes a transition response ramp time R, a start symbol SS, a preamble PR, CI for different kinds of channel, SACCH, TCH, and CRC. The SACCH of two physical slots makes 1 frame.

The construction of the frame of SACCH of the layer 2 is made like this: a layer 2 field shown by reference character t2 exists after a slot order bit shown by t1.

As for TDMA/TDD techniques, TCH, SACCH, and LAPDC, details are mentioned in standard RCR STD-28 in the second generation cordless telephone system, by Zaidan Houjin Denpa System Development Center. LAPDC is used in PHS for the second generation cordless telephone system, and it uses the sub set of HDLC for transmit procedure.

<Explanation on the Mode in Digital Radio Communication System>

Figure 3:
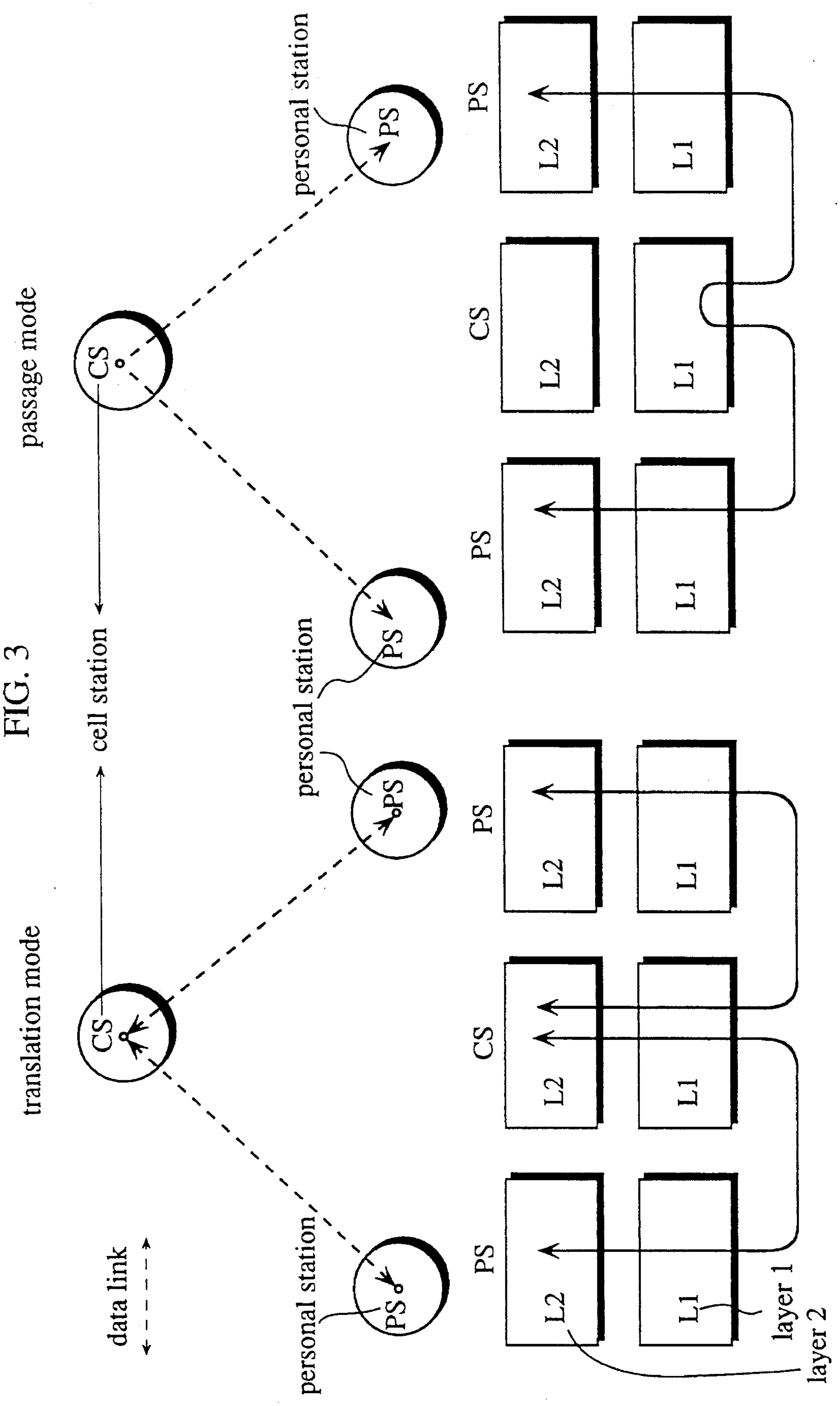
FIG. 3 shows how a data link is established in a translation mode and a passage mode.

The digital radio communication of the present embodiment includes a translation mode and a passage mode. These modes are explained by means of FIG. 3 showing how the communication protocol is applied to the translation mode and the passage mode.

In the translation mode, the data link is established between the PS at the sender's end and the CS, and between the CS and the PS at the receiver's end. The translation mode starts operation when the PSs are carried to the areas of bad wave condition or the wave condition around the CS becomes bad.

In the passage mode, the data link is established only between the PS at the sender's end and the PS at the receiver's end. This mode starts operations when the wave condition around the PS and the CS is good.

Processing at the CS and the PS can be explained by the OSI reference model. In the translation mode, processing of layer 2 is carried out at the CS and the PS. In the passage mode, processing of layer 2 is carried out at the PS at both ends. At the CS, only processing of layer 1 is carried out. In the translation mode, the reliability of sending and receiving information signal is enhanced since processing of layer 2 is carried out at the PS at both ends and the CS. On the other hand, in the passage mode, processing of layer 2 is carried out at PS at both ends but not at the CS. So the speed of the sending and receiving information signal increases. However, the reliability of the sending and receiving information signal drops a little compared to the case in the translation mode. The transmission delay of the information signal by processing of layer 2 at the CS is called control delay.

The transition between the passage mode and the translation mode is decided by the mode transition sequence which depends on the coordination between the PS at the sender's end and the CS, between the CS and the PS at the receiver's end, and between the PS at both ends. The mode transition sequence comprises sending and receiving the command for the mode transition, disconnection of the data link, and the re-establishment of the data link.

<The Command for the Mode Transition Sequence Sent by SACCH>

FIG. 4 shows transition commands between the translation mode and the passage mode used in the present digital radio communication system. In FIG. 4, these transition commands are shown in table t3.

Figure 2:
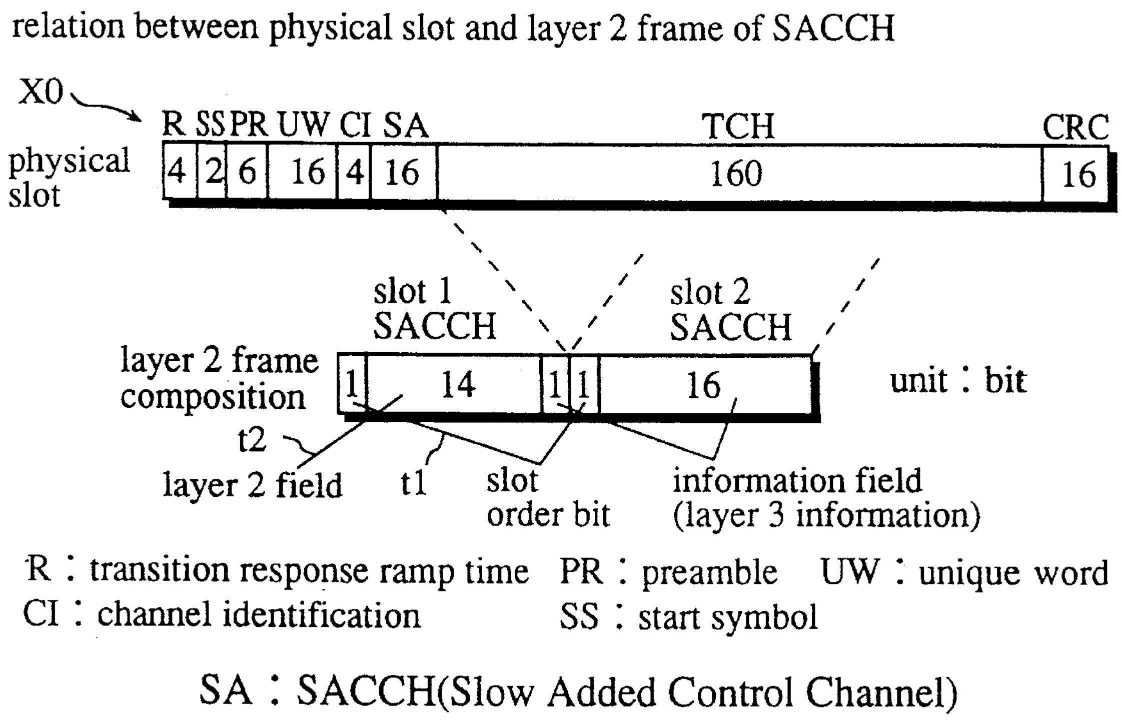
FIG. 2 shows relation between layer 2 frame, a TCH, and a SACCH.

The transition command is 2 byte, and written in the layer 2 field of the SACCH in FIG. 2.

As shown in FIG. 4, when the PS recognizes bad wave condition in the passage mode, a translation mode transition demand 1001 is sent from the PS to the PS at the other end. When the CS recognizes the bad wave condition, the translation mode transition demand 1001 is sent from the CS to the PS at both ends.

In the passage mode, a translation mode transition response 1002 is sent to the CS by the PS when the PS receives the translation mode transition demand 1001. Also the translation mode transition response 1002 is sent, by the CS, to the sender of the translation mode transition demand 1001 when the CS confirms the passage of the translation mode transition demand 1001.

In the passage mode, a translation mode transition demand 1003 is sent to the PS by the CS when the CS receives the translation mode transition response 1002 in the passage mode.

A passage mode transition demand 1004 is sent to the PS at both ends from the CS when the CS recognizes the wave condition becomes good.

In the translation mode, a passage mode transition response 1005 is sent to the CS from the PS when the PS receives the passage mode transition demand 1004. Also the passage mode transition response 1005 is sent to the sender of the passage mode transition demand 1004 by the CS when the CS receives the passage mode transition demand 1004.

A passage mode transition direction 1006 is given when the translation mode is changed to the passage mode. In the translation mode, the passage mode transition direction 1006 is sent to the PS by the CS when the CS receives the passage mode transition response 1005 from the PS.

According to the present embodiment, these commands are sent and received by the SACCH, but FACCH can also be used.

<Internal Construction of the CS and the Operation>

Figure 5B:
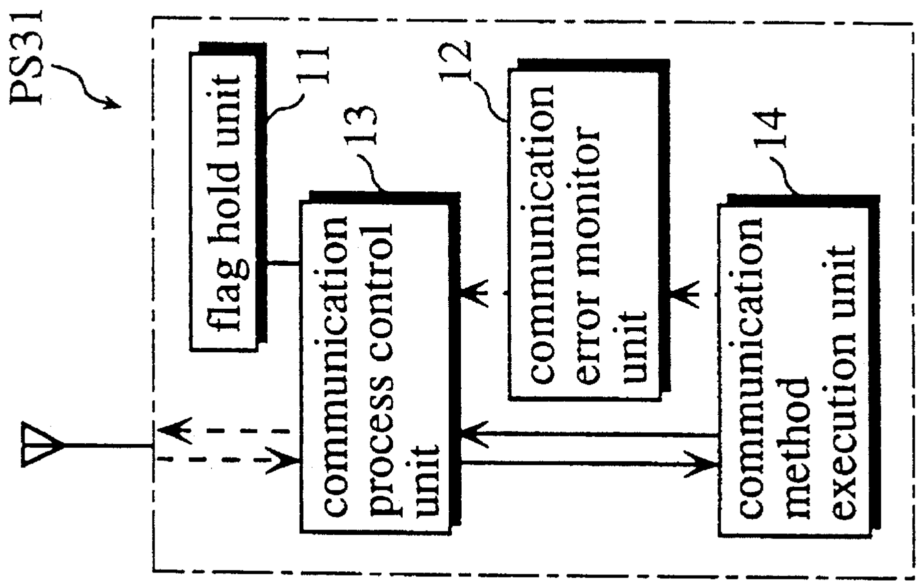
FIG. 5B shows construction of a personal station 31.
Figure 5A:
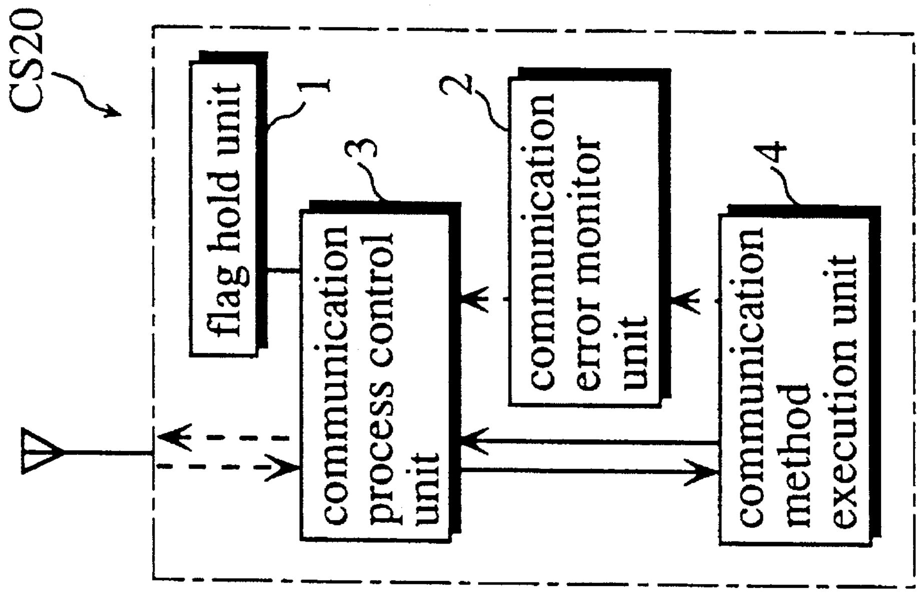
FIG. 5A shows construction of a cell station 20.

Next, the internal construction of the CS is described by means of FIGS. 5A and 5B, which show the construction of a CS 20 and a PS 31.

The CS 20 carries out the digital radio communication of the information signal and the mode transition, including a flag hold unit 1, a communication error monitor unit 2, a communication process control unit 3 and a communication procedure execution unit 4.

The flag hold unit 1 holds a flag which shows the mode being used in the digital radio communication system. When this flag is off, it means the passage mode is being used; when it is on, it means the translation mode is being used.

The communication error monitor unit 2 monitors a synchronization gap or monitors CRC (Cyclic Redundancy Check) error in sending the TDMA frame.

The communication process control unit 3 carries out the digital radio communication between the CS and the PS in the radio zone of the CS. It also totals the number of error frames monitored by the communication error monitor unit 2 per set time period, and outputs the totaled value as a generation rate. Also it turns the flag off when the generation rate is lower than a predetermined threshold value and carries out the mode transition sequence from the transition mode to the passage mode in coordination with the PS. Moreover, when it receives the transition demand to the passage mode sent by the PS, it turns the flag on, sends the translation mode transition response to the sender, and sends the translation mode transition direction to the PS at both ends. According to the present embodiment, the time period is set to 60 seconds and threshold of the generation rate is set to 50%. This is because in frame sending and receiving per 60 seconds, if the generation rate of the synchronization gap in sending frames or CRC error is lower than 50%, the reliability of the information transmit is supposed to be maintained by the application of the transmit control procedure to the PS at both ends. When the generation rate is higher than 50%, the transmit control procedure at the CS is supposed to be needed to maintain the reliability.

The communication procedure execution unit 4 applies the transmit control procedure to the digital radio communication which is carried out by the communication process control unit 3.

Figure 6:
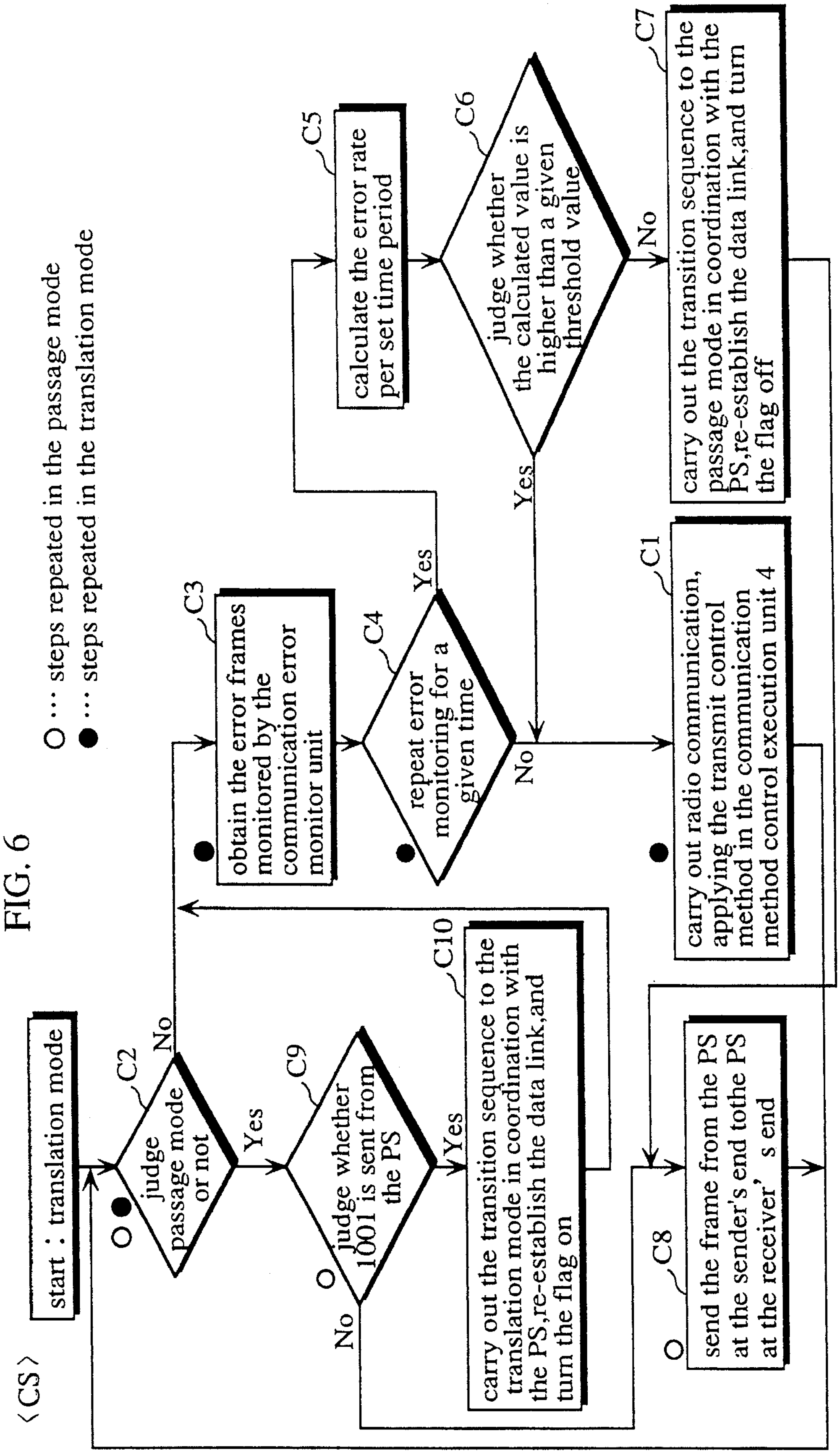
FIG. 6 is a flow chart which shows control by a communication process control unit 3 of the cell station.

FIG. 6 is a flow chart which shows the control by the communication process control unit 3. Steps with the white circles show the passage mode (Steps c2, c8, c9). Steps with the black circles show the translation mode (Steps c1, c2, c3, c4).

Explanation on how each construction of the CS in FIG. 5A operates by the control in FIG. 6 follows next.

When the power is turned on at the PS, the translation mode starts, and the physical slot, in which the TCH and the SACCH are combined by the time division multiplexing, is sent and received between the PS at both ends. The communication process control unit 3 of the CS outputs the frames of the TCH and the SACCH, which were received from the PS at the sender's end, to the communication procedure execution unit 4. Then it inputs the frames from via the communication procedure execution unit 4, and sends the inputted frames to the PS at the receiver's end. Frames are successively inputted into the communication procedure execution unit 4. Then it applies the transmit control procedure to the inputted frames. In the transmit control procedure, the communication procedure execution unit 4 gives numbers to the frames in order of the input.

While the above mentioned process is carried out, the PS at the sender's end is carried within the radio zone of the CS. When the PS at the receiver's end moves to the areas of bad wave condition, it cannot receive the frames normally. The communication procedure execution unit 4, which checks which frame was just sent from the communication process control unit 3, judges the frame should be sent again. Then the communication process control unit 3 sends the frame again.

In the translation mode, the communication process control unit 3 repeats Steps c1–4. In Step c3, the communication process control unit 3 inputs the number of error frames monitored by the communication error monitor unit 2.

When a predetermined time period passes after Steps c1–4 are repeated, Step c5 follows after Step c4. In Step c5, the generation rate per set time period is calculated, and the value is outputted as the generation rate.

(Step c6) Next, the communication process control unit 3 judges whether the calculated value is higher than a predetermined threshold value.

(Step c7) When the calculated value is higher than the threshold value, the communication process control unit 3 sends the already received frame in the translation mode to the PS, and carries out the mode transition sequence from the translation mode to the passage mode in coordination with the PS and turns the flag off.

When the data link is established in this way, the translation mode is changed to the passage mode. Then, the communication process control unit 3 starts Step c8, sending the frame received from the PS at the sender's end to the PS at the receiver's end. And it prevents the application of the transmit control procedure by the communication procedure execution unit 4.

Next, in Step c2, the communication process control unit 3 judges whether the passage mode is being used or not, but since the flag is off, the communication process control unit 3 changes to Step c9. In Step c9, the communication process control unit 3 refers to the SACCH attached to the TCH in frames, and judges whether the translation mode transition demand is included in the SACCH. If it is not included, the communication process control unit 3 changes back to Step c8, and Steps c 2, 8, 9 are repeated. Frame sending and receiving in the passage mode is carried on.

If the transfer mode transition demand is included in the SACCH in Step c9, the communication process control unit 3 sends the translation mode transition response to the PS, and the translation mode transition direction to the PS at both ends. And it turns on the flag which is held by the flag hold unit 1. In this way, the passage mode is changed to the translation mode.

<The Internal Construction of the PS and the Operation>

FIG. 5B shows the internal construction of the PS.

The PS carries out the digital radio communication of the information signal and transition between the translation mode and the passage mode, including a flag hold unit 11, a communication error monitor unit 12, a communication process control unit 13, and a communication procedure execution unit 14. The flag hold unit 11 holds a flag which shows the mode being used in the digital radio communication system. When this flag is off, it means the passage mode is being used; when it is on, it means the translation mode is being used.

The communication error monitor unit 12 monitors a synchronization gap frame or monitors CRC error in sending the TDMA frame.

The communication process control unit 13 carries out the digital radio communication between the Ps and the CS. It also totals the number of error frames monitored by the communication error monitor unit 12 per set time period, and outputs the calculated value as a generation rate. Also it turns the flag on when the generation rate is higher than the threshold value, and carries out the mode transition sequence from the passage mode to the translation mode in coordination with the CS. Moreover, when it receives the transition demand to the passage mode sent by the CS, it turns the flag off and sends the passage mode transition response to the CS. According to the present embodiment, like the case of the communication process control unit 3, the time period is set to 60 seconds and threshold of the generation rate is set to 50%.

The communication procedure execution unit 14 applies the transmit control procedure to the digital radio communication which is carried out by the communication process control unit 13.

Figure 7:
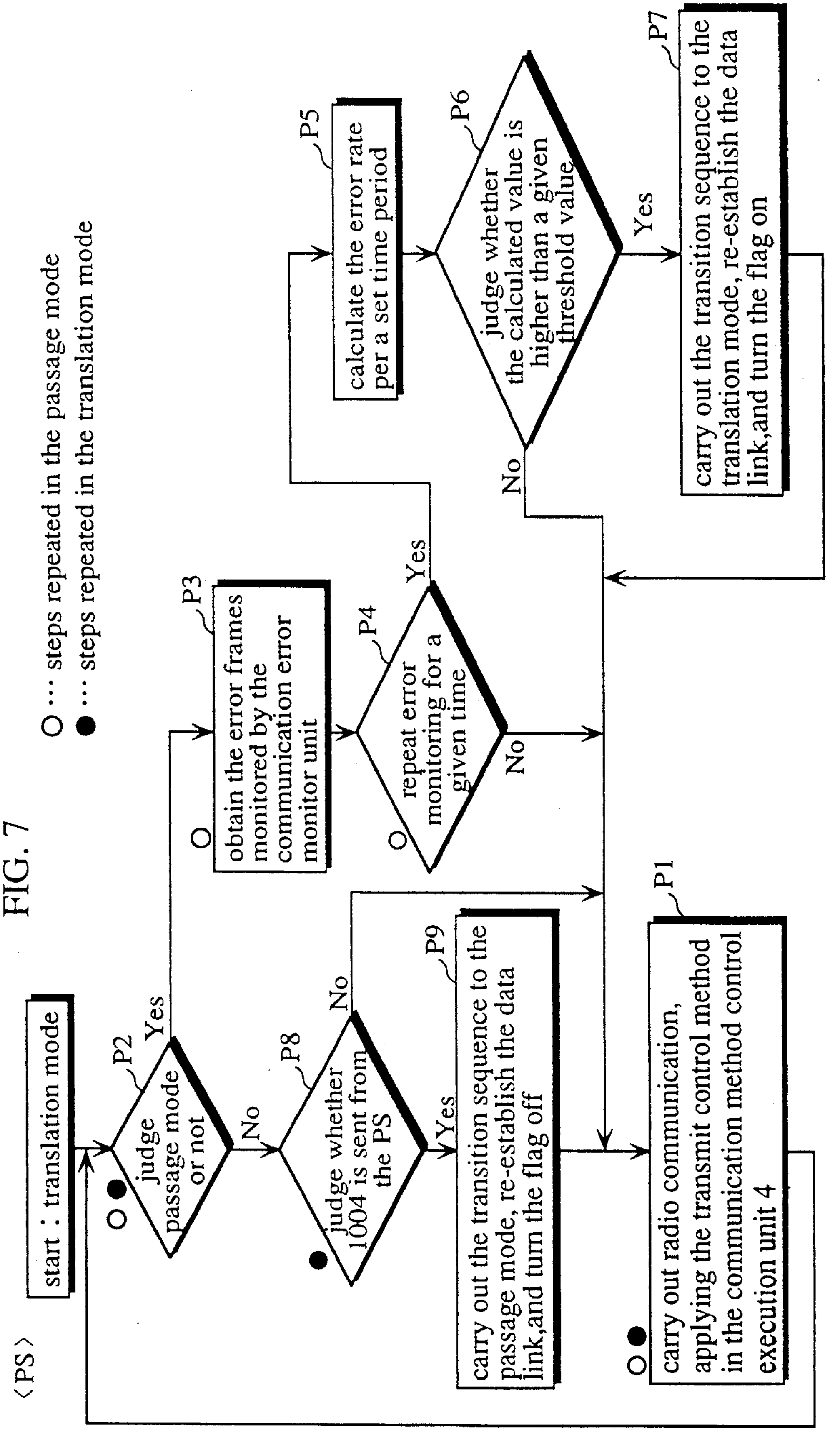
FIG. 7 is a flow chart which shows control by a communication process control unit 13 of the personal station.

FIG. 7 is a flow chart which shows the control by the communication process control unit 13. The white circles show steps repeated in the passage mode (Steps p1, p2, p3, p4). The black circles shows steps repeated in the translation mode (Steps p1, p2, p8).

Explanation on how each construction of the PS in FIG. 5B operates by the control in FIG. 7 follows next.

In the passage mode, the frames of the TCH are sent and received. The communication process control unit 13 of the PS outputs the frames of the TCH, which were received from the CS to the communication procedure execution unit 14. Then it inputs the frames from via the communication procedure execution unit 4, and sends the inputted frame to the PS at the receiver's end. Frames are successively inputted into the communication procedure execution unit 14. Then it applies the transmit control procedure to the inputted frames.

The communication process control unit 13 repeats Steps p1–4. Each time the process is repeated, in Step p3, the communication process control unit 13 inputs the number of error frames monitored by the communication error monitor unit 12.

(Step p4) When a predetermined time period passes after Steps p1–p4 are repeated, (Step p5) the communication process control unit 13 calculates the number of the inputted frames, (Step p6) and judges whether the calculated value is higher than a predetermined threshold value.

(Step p7) When the calculated value is higher than the threshold value, the communication process control unit 13 carries out the mode transition sequence from the translation mode to the passage mode in coordination with the PS at the receiver's end and turns the flag on. In this way, the passage mode is changed to the translation mode. Then, the communication process control unit 13 applies the transmit control procedure by the communication procedure execution unit 14 to the frames received from the PS at the sender's end in Step p1.

In Step p2, the communication process control unit 13 judges whether the passage mode is being used or not. Since the flag is on, the communication process control unit 13 changes to Step p8, refers the SACCH attached to the TCH and judges whether the translation mode transition demand is included in the SACCH. If it is not included, Steps p1, p2, and p8 are repeated so that the frames are sent and received in the passage mode.

If the passage mode transition demand is included in the SACCH in Step p8, the communication process control unit 13 sends the translation mode transition response and the translation mode transition direction in Step p9 and turns the flag on. In this way, the passage mode is converted to the translation mode.

<Explanation on the Operation Referring to the Sequence>

Figure 8:
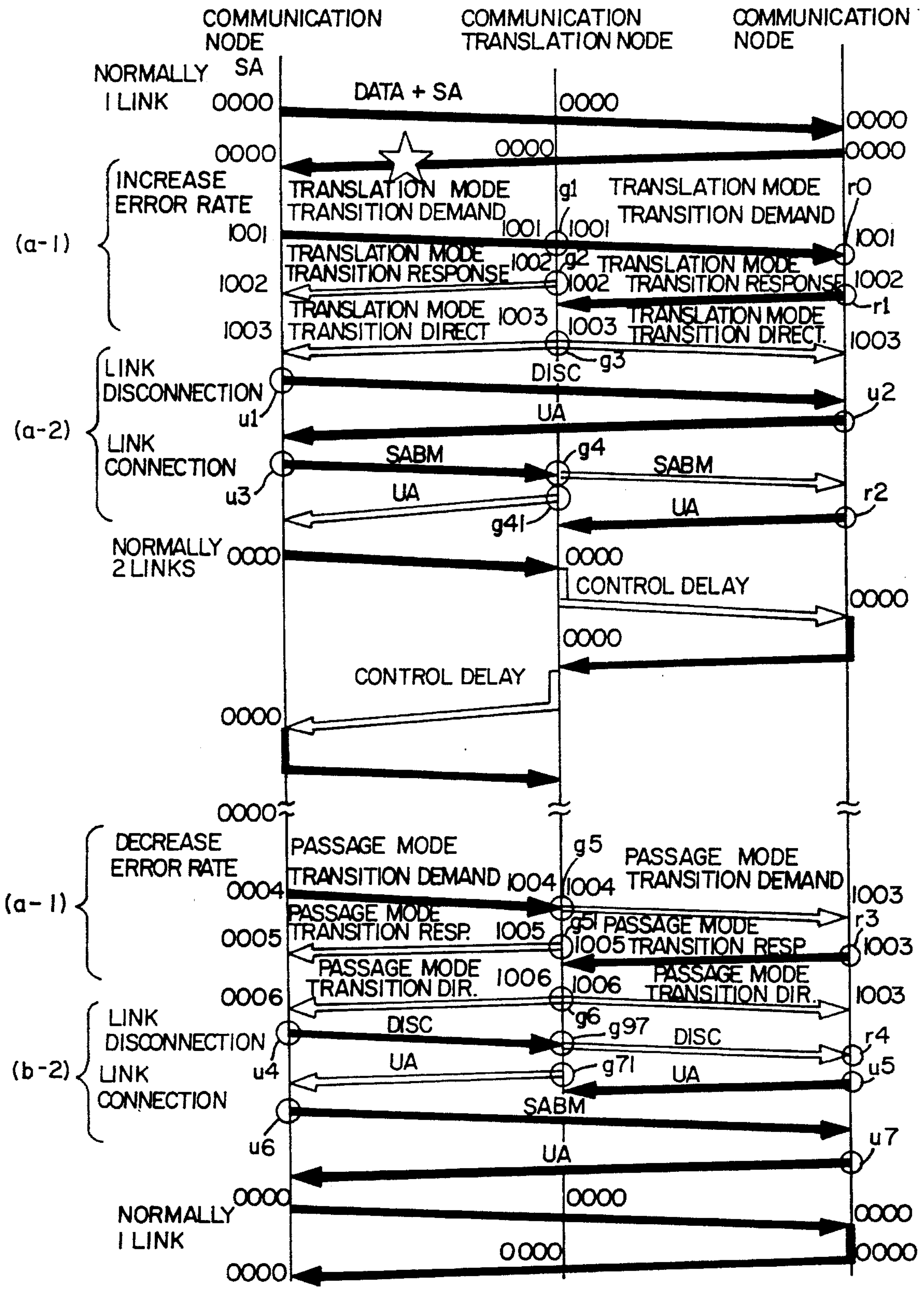
FIG. 8 shows a mode transition sequence according to a demand from the cell station.
Figure 9:
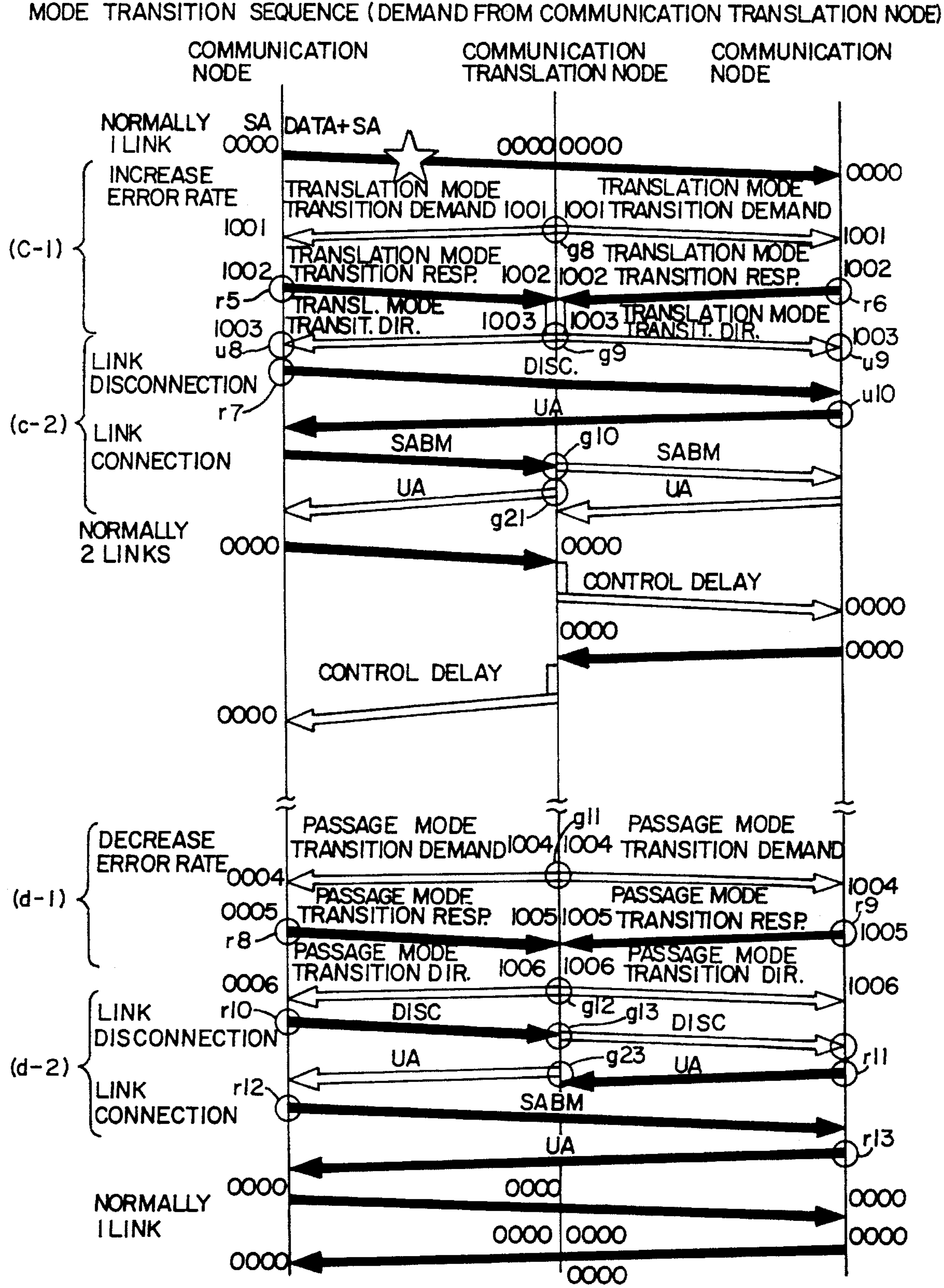
FIG. 9 shows a mode transition sequence according to a demand from the personal station.

FIGS. 8 and 9 show the details of the mode transition sequence. Both figures are divided into small sections such as (a-1), (a-2), (b-1), (b-2), (c-1), (c-2) . . . Explanation follows by the small section. Shaded arrows show sending from the PS at both ends. Unshaded arrows show sending from the CS. White circles with the reference character show important timings of sending and receiving.

In the following explanation, processing by the communication process control unit 3 and the communication procedure execution unit 4 of the CS are described as processing by the CS. Processing by the communication process control unit 13 and the communication procedure execution unit 14 are described as processing by the PS. In the FIGS. 8 and 9, SABM means the Set Asynchronous Balanced mode Command in the standard of the 'second generation cordless telephone system. DISC means the disconnect command. UA is the Unnumbered Acknowledgement Response. The SABM, the DISC, and the UA are standardized in the second generation cordless telephone system. So explanation is omitted.

{(a-1) Sending and Receiving the Transition Command based on the Detection of the Passage of the Translation Mode Transition Demand 1001 by the CS}

When the digital radio communication is carried out by the passage mode and the PS at the sender's end is carried to the areas of bad wave condition, the generation rate of the error frames increases greatly. The PS at the sender's end judges the passage mode should be changed to the translation mode and sends a translation mode transition demand 1001. The translation mode transition demand 1001 passes the CS, and is sent to the PS at the receiver's end. The CS monitors the SACCH which passes through the CS itself, so it has already detected the passage of the translation mode transition demand 1001 at g1. So the CS sends a translation mode transition response 1002 to the PS at the sender's end at g2. On the other hand, the PS, which received the translation mode transition demand 1001 at r0, sends the translation mode transition response 1002 to the CS at r1. After a translation mode transition response 1000 is sent at r1, the CS sends a translation mode transition direction 1003 to the PS at both ends at g3.

{(a-2) Re-establishment of the Data Link}

The PS at the sender's end receives the translation mode transition direction 1003, and sends the DISC to the PS at the receiver's end at u1. The PS at the receiver's end receives the DISC, and sends the UA to the PS at the sender's end at u2. Then the PS sends the SABM to the CS at u3. The CS receives the SABM and sends it to the PS at the receiver's end. After that, the CS sends the UA to the PS at the sender's end at g41. Then the PS at the receiver's end, which received the SABM, sends the UA to the CS at r2. When the PS at the sender's end receives the UA, the data link is re-established, and the passage mode changes to the translation mode.

Then, the information signal is sent through the data link between the PS at the sender's end and the CS. The CS, which received the information signal, sends it through the data link after the delay described as "control delay". The PS at the receiver's end receives the information signal and sends it to the CS. Then the CS sends the information signal through the data link after the delay.

{(b-1) Sending and Receiving the Transition Command under the Monitor by the CS for the Decrease of the Error Frames}

When the number of error frames are decreased after the PS is carried to a different place, the CS judges the translation mode should be changed to the passage mode, and sends a passage mode transition demand 1004 to the CS. The CS receives the passage mode transition demand 1004 at g5, and sends it to the PS at the receiver's end. After that, the CS sends a passage mode transition response 1005 to the PS at the sender's end at g 51. The PS, which received the passage mode transition demand 1004, sends the passage mode transition response 1005 to the CS at r3. After that, the CS, which received the passage mode transition response 1005, sends a passage mode transition direction 1006 to the PS at both ends at g6.

{(b-2) Re-establishment of the Data Link for the Transition from the Translation Mode to the Passage Mode}

The PS at the sender's end, which received the passage mode transition direction 1006, sends the DISC at u4. The CS receives the DISC, sends it to the PS at the sender's end at g7, and sends the UA to the PS at the receiver's end at g71. The PS at the receiver's end, which received the DISC at r4, sends the UA to the CS at u5. The PS at the sender's end, which received the UA from the CS, sends the SABM to the PS at the receiver's end at u6. The PS at the receiver's end, which received the SABM, sends the UA to the PS at the sender's end at u7. By sending the UA, the data links between the PS and the CS, and between the PS at both ends is re-established. Then the translation mode changes to the passage mode.

{(c-1) Sending and Receiving the Transition Command under the Monitor by the CS for the Increase of the Error Frames}

When digital radio communication is carried out by the passage mode and the PS at the sender's end is carried to the areas of bad wave condition, the error frames increase greatly. Then the CS judges that the passage mode should be changed to the translation mode, and sends the translation mode transition demand 1001 to the PS at both ends at g8. Then the PS at both ends receives it, and sends the translation mode transition response 1002 to the CS at r5 and r6. The CS receives it and sends the translation mode transition direction 1003 to the PS at both ends at g9. Then the PS at both ends receives the translation mode transition direction 1003 at u8 and u9.

{(c-2) Re-establishment of the Data Link}

After receiving the translation mode transition direction 1003, the PS at the sender's end sends the DISC to the PS at the receiver's end at r7. The PS at the receiver's end, which received the DISC, sends the UA to the PS at the sender's end at u10. The PS at the sender's end, which received the UA, sends the SABM to the CS. The CS, which received the SABM, sends it to the PS at the receiver's end and then sends the UA to the PS at the sender's end at g21. The PS, which received the SABM, sends the UA to the CS. When the data link is re-established in this way, the passage mode changes to the translation mode.

Then, the PS at the sender's end sends the information signal to the CS through the data link. The CS, which received the information signal, sends it to the PS at the receiver's end through the data link. The PS at the receiver's end receives the information signal, and sends it to the CS. The CS, which received the information signal, sends it to the PS at the sender's end through the data link, after the delay described as the control delay in the FIG. 9.

{(d-1) Sending and Receiving the Transition Command under the Monitor by the CS for the Decrease of the Error Frames}

When the wave condition becomes good and the number of error frames decreases, the CS judges that the translation mode should be changed to the passage mode, and sends the passage mode transition demand 1004 to the PS at both ends at g11. Then the PS at both ends receive the passage mode transition demand 1004, and send the mode transition respond 1005 to the CS at r8 and r9. Then the CS, which received the passage mode transition response 1005, sends the passage mode transition direction 1006 to the PS at both ends at g12.

{(d-2) Re-establishment of the Data Link for the Transition from the Translation Mode to the Passage Mode}

The PS at the sender's end, which received the passage mode transition direction 1006, sends the DISC to the CS at r10. The CS receives the DISC, sends it to the PS at the sender's end at g13, and sends the UA to the PS at the receiver's end at g23. The PS at the receiver's end, which received the DISC, sends the UA to the CS at r11. The PS at the sender's end, which received the UA from the CS, sends the SABM to the PS at the receiver's end at r12. The PS at the receiver's end, which received the SABM, sends the UA to the PS at the sender's end at r13. Then the data link is re-established, and the translation mode changes to the passage mode.

According to the present embodiment, when the generation rate of the error frames is high, the information signal is sent and received through the data link between the CS and the PS; when he generation rate is low, the information signal is sent and received through the data link between the PS at both ends. So when the wave condition is good, control delay, which is created by processing of layer 2 at the CS, can be prevented; when the wave condition is bad, the reliability of sending and receiving the information signal through the data link between the CS and the PS can be enhanced, and the speed of the communication increases.

Unlike the present embodiment, the transition between the translation mode and the passage mode can be carried out without the disconnection and the re-establishment of the data link. The application follows next.

In the passage mode, in addition to processing of layer 1, a parameter control process is carried out at the CS.

The parameter control process means copying the layer 2 parameter used between the PS at both ends when it passes the CS.

Then, the copy of the layer 2 parameter is changed at the CS. When the mode is changed to the translation mode, the layer 2 parameter is switched to the changed copy. By this switching, processing of the layer 2 is carried out at the CS. Very little delay is expected.

In this way, the passage mode is changed to the translation mode without the disconnection and the re-establishment of the data link.

Although the present apparatus has been fully described by way of examples with reference to the accompanying drawings, it is to be noted that various changes and modifications will be apparent to those skilled in the art. Therefore, unless such changes and modifications depart from the scope of the present apparatus, they should be construed as being included therein.

PHS is used in the present embodiment, but any system can be applicable instead as long as it is a radio communication system. Part of the communication can be carried out through cord.

Moreover, in the present embodiment, 2 data links between the PS at the sender's end and the CS, and between the CS and the PS at the receiver's end, are used. But present invention can be applicable to a radio communication system in which more data links are established, for example, between the CSs or between the PSs.

What is claimed is:

1. A cell station for relaying communication between a first personal station and a second personal station in a digital radio communication system, the digital radio communication system having a plurality of personal stations and the cell station, comprising:

a first sending and receiving means for sending and receiving frames to and from the first personal station;

a second sending and receiving means for sending and receiving frames to and from the second personal station;

a first data link means for controlling a data link when the frames are sent and received to and from the first sending and receiving means and the first personal station by application of a transmit control procedure including error correction/detection control and frame re-transmit control for transmit errors;

a second data link means for controlling a data link when the frames are sent and received to and from the second sending and receiving means and the second personal station by the application of the transmit control procedure including error correction/detection control and frame re-transmit control for transmit errors;

a relay means for translating the frames alternatively between the first sending and receiving means and the second sending and receiving means;

a switch judgement means for judging whether application of the transmit control procedure should be stopped or resumed, according to the condition of the frame sending and receiving between the first sending and receiving means and the first personal station, and between the second sending and receiving means and the second personal station; and a control means for controlling the first and the second data link means to stop application of the transmit control procedure when the switch judgement means judges the application of the transmit control procedure should be stopped, and to resume the application of the transmit control unit when the switch judgement means judges the application of the transmit control procedure should be resumed.

2. The cell station of claim 1, wherein the control means includes:

a flag hold means for holding a flag for showing the application of the transmit control procedure when it is on, and showing stop of the application when it is off;

a stop means for controlling the first and the second data link means to stop the application of the transmit control procedure when the switch judgement means judges the application of the transmit control procedure should be stopped, and turning the flag off; and a resume means for controlling the first and the second data link means to resume the application of the transmit control procedure when the switch judgement means judges the application of the transmit control procedure should be resumed, and turning the flag on.

3. The cell station of claim 2, wherein the switch judgement means includes:

a monitor means for monitoring a generation rate of communication errors corresponding to deterioration of the condition of the frame sending and receiving;

a threshold value hold means for holding a predetermined threshold value; and a judgement means for comparing the generation rate and the threshold value, judging that the application of the transmit control procedure should be stopped when the generation rate is lower, and judging that the application should be resumed when the generation rate is higher.

4. The cell station of claim 3, wherein the stop means includes:

a disconnection demand sending control means for making the first and the second sending and receiving means send a demand to disconnect data links between the first personal station and the cell station, and between the second personal station and the cell station to the first and the second personal stations;

a data link disconnection control means for controlling the first and the second data link means to disconnect the data links between the first personal station and the cell station, and the second personal station and the cell station after the demand to disconnect the data link is sent;

a flag switch means for turning the flag off when the data link is disconnected by the data link disconnection means; and wherein the first and the second data link means disconnects the data links between the first personal station and the cell station, and between the cell station and the second personal station.

5. The cell station of claim 4, wherein the stop means further includes:

an establishment demand sending control means for making the first and the second sending and receiving means send a demand to establish a data link between the first personal station and the second personal station to the first and the second personal station, after the disconnection demand sending control means sends the demand to disconnect the data link.

6. The cell station of claim 5, wherein the transmit control procedure is an HDLC, which is a High-level Data Link Control Procedure; and the first and the second data link means sends a DISC, which is a disconnect command, to the first and the second personal station, according to the data link disconnection control means.

7. The cell station in claim 6, wherein the first and the second data link means sends a UA, which is an Unnumbered Acknowledgement Response, to the first personal station and the DISC to the second personal station when the DISC is sent from one of the first and the second personal station.

8. The cell station in claim 2, wherein the switch judgement means includes:

a demand detection means for detecting one of a demand to resume and a demand to stop the application of the transmit control procedure included in the frames from the first and the second personal station;

a judgement means for judging that the application of the transmit control procedure should be stopped when the demand to stop the application is included in the frame, and judging that the application of the transmit control procedure should be resumed when the demand to resume the application is included in the frame; and the first and the second personal station send the demand to stop the application of the transmit control procedure to the cell station when the condition of the frame sending and receiving is good, and send the demand to resume the application of the transmit control procedure to the cell station when the condition of the frame sending and receiving is bad.

9. The cell station of claim 8, wherein the digital radio communication system is a PHS, which is a Personal Handy Phone System, of a TDMA/TDD technique;

the demand to stop the application of the transmit control procedure is sent by using one of an SACCH and a FACCH, which are standardized in the PHS; and the demand detection means detects the demand to stop the application of the transmit control procedure included in one of the SACCH and the FACCH.

10. The cell station of claim 9, wherein the stop means includes:

a disconnection demand sending control means for making the first and the second sending and receiving means send a demand to disconnect data links between the first personal station and the cell station, and between the second personal station and the cell station to the first and the second personal stations;

a data link disconnection control means for controlling the first and the second data link means to disconnect the data links between the first personal station and the cell station, and the second personal station and the cell station after the demand to disconnect the data link is sent;

a flag switch means for turning the flag off when the data link is disconnected by the data link disconnection means; and wherein the first and the second data link means disconnects the data links between the first personal station and the cell station, and between the cell station and the second personal station.

11. The cell station of claim 10, wherein the stop means further includes:

an establishment demand sending control means for making the first and the second sending and receiving means send a demand to establish a data link between the first personal station and the second personal station to the first and the second personal station, after the disconnection demand sending control means sends the demand to disconnect the data link.

12. The cell station of claim 11, wherein the transmit control procedure is an HDLC, which is a High-level Data Link Control Procedure; and the first and the second data link means sends a DISC, which is a disconnect command, to the first and the second personal station, according to the data link disconnection control means.

13. The cell station of claim 12, wherein the first and the second data link means sends a UA, which is an Unnumbered Acknowledgement Response, to the first personal station and the DISC to the second personal station when the DISC is sent from one of the first and the second personal station.

14. The cell station of claim 2, wherein the switch judgement means includes:

a monitor means for monitoring a generation rate of communication errors corresponding to deterioration of the condition of the frame sending and receiving;

a threshold value hold means for holding a predetermined threshold value; and a judgement means for comparing the generation rate and the threshold value, judging that the application of the transmit control procedure should be stopped when the generation rate is lower, and judging that the application should be resumed when the generation rate is higher.

15. The cell station of claim 14, wherein the resume means includes:

a disconnection demand sending control means for making the first and the second sending and receiving means send a demand to disconnect a data link between the first personal station and the second personal station to the first and the second personal station when the switch judgement means judges the application of the transmit control procedure should be resumed;

a flag switch means for turning the flag on when the disconnection demand sending control means sends the demand to disconnect the data link; and wherein the data link between the first personal station and the second personal station is already established by the first and the second personal station, after the application of the transmit control procedure is stopped by the stop means.

16. The cell station of claim 15, wherein the resume means further includes:

an establishment demand sending control means for controlling the first and the second data link means to establish the data links between the first personal station and the cell station, and between the second personal station and the cell station, after the demand to disconnect the data links is sent.

17. The cell station in claim 16, wherein the transmit control procedure is the HDLC; and the first and the second data link means send an SABM, which is a Set Asynchronous Balanced Mode, to the first and the second personal station, according to the establishment demand sending control means.

18. The cell station in claim 17, wherein the first and the second data link means send the UA to the first personal station and the SABM to the second personal station, when the SABM is sent from one of the first and the second personal station.

19. The cell station of claim 2, wherein the switch judgement means includes:

a demand detection means for detecting one of a demand to resume and a demand to stop the application of the transmit control procedure included in the frames from the first and the second personal station;

a judgement means for judging that the application of the transmit control procedure should be stopped when the demand to stop the application is included in the frame, and judging that the application of the transmit control procedure should be resumed when the demand to resume the application is included in the frame; and the first and the second personal station send the demand to stop the application of the transmit control procedure to the cell station when the condition of the frame sending and receiving is good, and send the demand to resume the application of the transmit control procedure to the cell station when the condition of the frame sending and receiving is bad.

20. The cell station of claim 19, wherein the digital radio communication system is a PHS, which is a Personal Handy Phone System, of a TDMA/TDD technique;

the demand to resume the application of the transmit control procedure is sent by using one of an SACCH and a FACCH, which are standardized in the PHS; and the demand detection means detects the demand to resume the application of the transmit control procedure included in one of the SACCH and the FACCH.

21. The cell station of claim 20, wherein the resume means includes:

a disconnection demand sending control means for making the first and the second sending and receiving means send a demand to disconnect a data link between the first personal station and the second personal station to the first and the second personal station when the switch judgement means judges the application of the transmit control procedure should be resumed; and a flag switch means for turning the flag on when the disconnection demand sending control means sends the demand to disconnect the data link.

22. The cell station in claim 21, wherein the resume means further includes:

an establishment demand sending control means for controlling the first and the second data link means to establish the data links between the first personal station and the cell station, and between the second personal station and the cell station, after the demand to disconnect the data links is sent.

23. The cell station of claim 22, wherein the transmit control procedure is the HDLC; and the first and the second data link means send an SABM, which is a Set Asynchronous Balanced Mode, to the first and the second personal station, according to the establishment demand sending control means.

24. The cell station of claim 23, wherein the first and the second data link means send the UA to the first personal station and the SABM to the second personal station, when the SABM is sent from one of the first and the second personal station.

25. A personal station for digital radio communication relayed by a cell station, the digital radio communication system having a plurality of personal stations and the cell station, comprising:

a sending and receiving means for sending and receiving frames to and from an other personal station relayed by the cell station;

a data link means for applying a transmit control procedure to the frame sending and receiving between the sending and receiving means and the cell station;

a monitor means for monitoring a generation rate of communication errors in the received frames by the sending and receiving means; and a control means for making the sending and receiving means send a demand to stop application of the transmit control procedure to the cell station when the generation rate is lower than a predetermined threshold value.

26. The personal station in claim 25, wherein the control means includes:

a demand detection means for detecting a demand to disconnect the data link between the personal station and the cell station included in the frame from the cell station, the demand being included in the frame from the cell station;

a data link disconnection control means for controlling the data link means to disconnect the data link between the personal station and the cell station after the demand to disconnect the data link is detected.

27. The personal station in claim 26, wherein the control means further includes:

a data link establishment control means for controlling the data link means to establish a data link between the cell station and the other personal station, when the data link between the personal station and the cell station is disconnected.

28. The personal station in claim 27, wherein the transmit control procedure is the HDLC; and the data link means sends the UA to the cell station after the DISC is sent from the cell station.

29. The personal station in claim 28, wherein the data link means sends the DISC to the cell station and receives the UA from the cell station, according to the data link disconnection control means.

30. The personal station of claim 29, wherein the digital radio communication system is the PHS using the TDMA/TDD technique;

the demand to stop the application of the transmit control procedure is sent by one of the SACCH and the FACCH; and the demand detection means detects the demand to stop the application of the transmit control procedure included in one of the SACCH and the FACCH.

31. The personal station of claim 25, wherein the control means further includes:

a resume demand sending control means for making the sending and receiving means send a demand to resume the application of the transmit control procedure to the cell station, when the generation rate is higher than the predetermined threshold value.

32. The personal station of claim 31, wherein the demand detection means detects the demand to disconnect the data link between the personal station at both ends included in the frame from the cell station; and the data link disconnection control means controls the data link means to disconnect the data link between the personal station at both ends, after the demand to disconnect the data link is sent; and the data link between the personal station at both ends is already established by personal station at both ends, after the application of the transmit control procedure is stopped at the cell station.

33. The personal station of claim 32, wherein the control means further includes:

a data link re-establishment control means for controlling the data link means to establish the data link between the personal station and the cell station, when the data link between the personal station at both ends is disconnected.

34. The personal station of claim 33, wherein the transmit control procedure is the HDLC; and the data link means sends the UA to the cell station, after the cell station sends the SABM.

35. The personal station of claim 34, wherein the data link means sends the SABM to the cell station, according to the data link disconnection control means.

36. The personal station of claim 35, wherein the digital radio communication system is the PHS of the TDMA/TDD techniques;

the demand to resume the application of the transmit control method is sent by one of the SACCH and the FACCH; and the demand detect means detects the demand to resume the application of the transmit control procedure included in one of the SACCH and the FACCH.

* * * * *